United States Patent [19]

Swisher

[11] 4,436,970
[45] Mar. 13, 1984

[54] SWITCH ASSEMBLIES

[75] Inventor: William F. Swisher, Carthage, Ill.

[73] Assignee: Methode Electronics, Inc., Chicago, Ill.

[21] Appl. No.: 385,496

[22] Filed: Jun. 7, 1982

[51] Int. Cl.³ .......................... H01H 9/00; H01H 1/06
[52] U.S. Cl. ............................. 200/61.56; 200/164 R; 200/275
[58] Field of Search ................. 200/5 A, 61.55, 61.56, 200/61.57, 86 R, 164 R, 164 A, 238–242, 275

[56] References Cited

U.S. PATENT DOCUMENTS

| | | | |
|---|---|---|---|
| 1,301,212 | 4/1919 | Albright | 200/61.57 X |
| 2,008,546 | 7/1935 | Findley | 200/61.55 X |
| 3,691,324 | 9/1972 | Brantingson | 200/5 A X |
| 3,712,970 | 1/1973 | Adie | 200/164 R X |
| 3,947,390 | 3/1976 | Johnson | 200/275 X |
| 3,996,429 | 12/1976 | Chu et al. | 200/5 A |
| 4,032,729 | 6/1977 | Koistinen | 200/5 A |
| 4,055,734 | 10/1977 | Hayden | 200/5 A |
| 4,065,651 | 12/1977 | Erni et al. | 200/275 X |
| 4,254,309 | 3/1981 | Johnson | 200/5 A |
| 4,343,973 | 8/1982 | Main | 200/5 A X |

Primary Examiner—J. R. Scott
Attorney, Agent, or Firm—Charles F. Pigott, Jr.

[57] ABSTRACT

Switch assemblies providing switching action with audio and tactile feedback. Warped or raised tactile areas are formed on a conductive body and create a desired noise and feel upon being depressed. The tactile areas also act as electrical contact in the switch assemblies.

16 Claims, 13 Drawing Figures

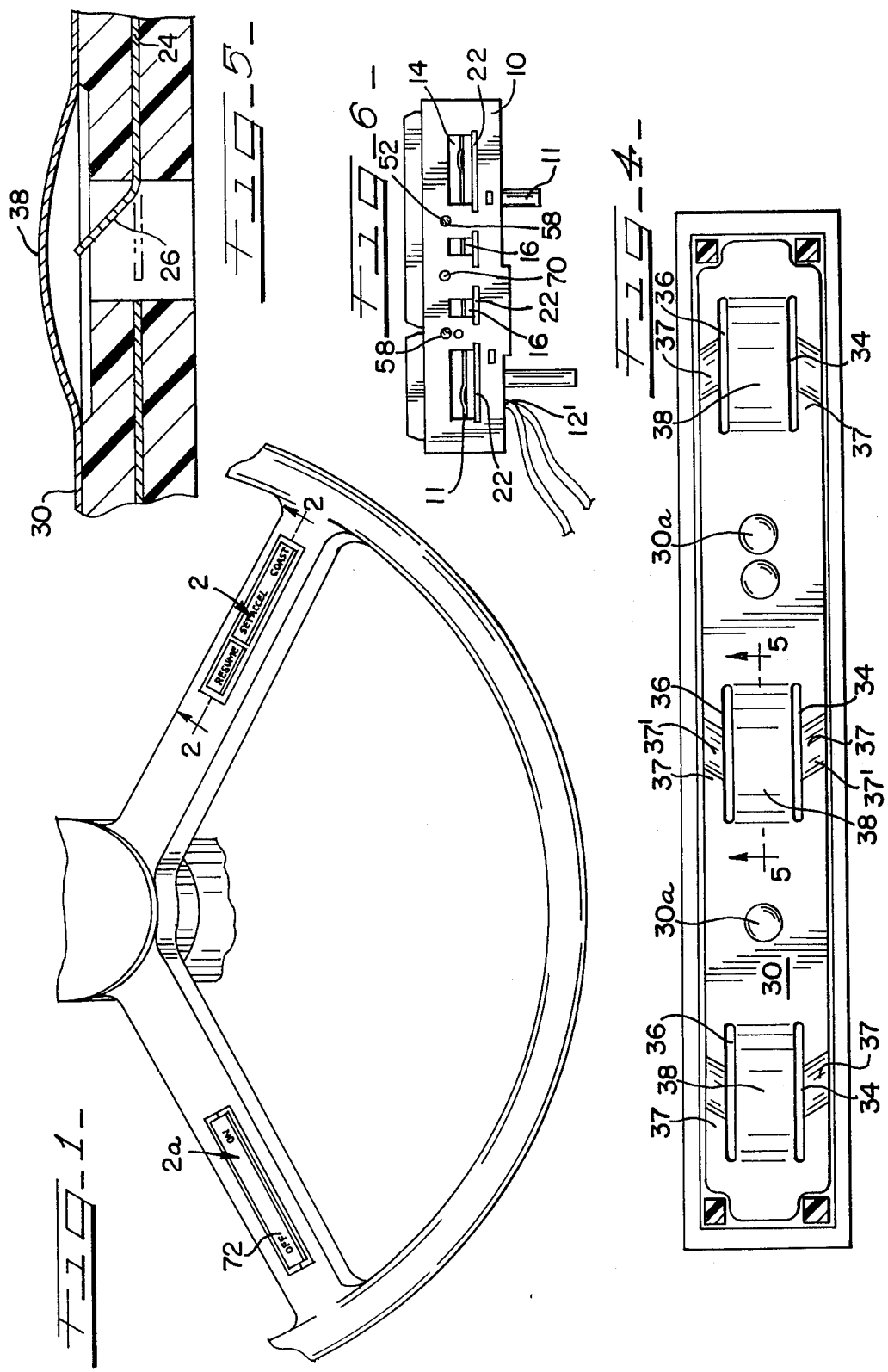

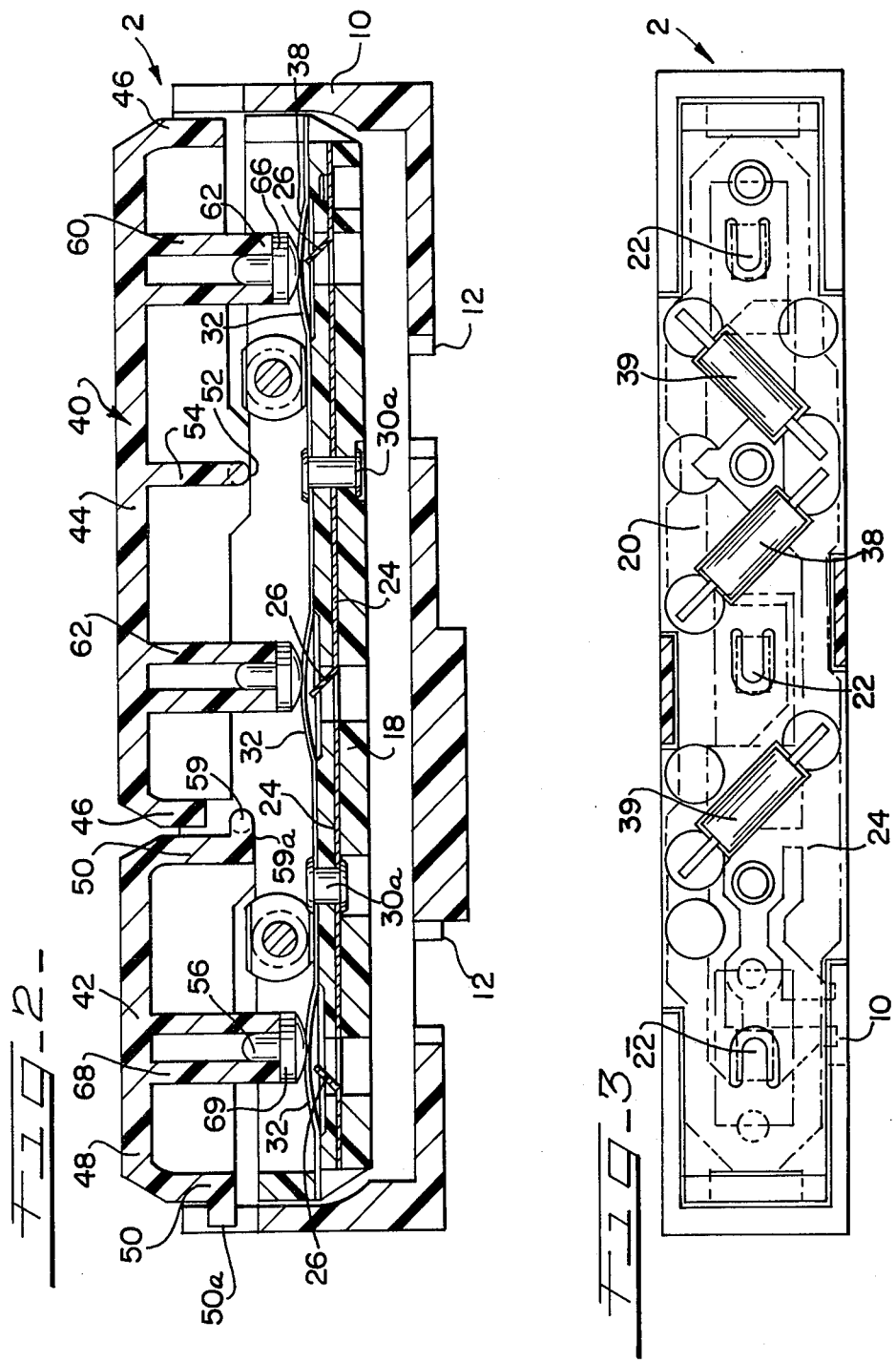

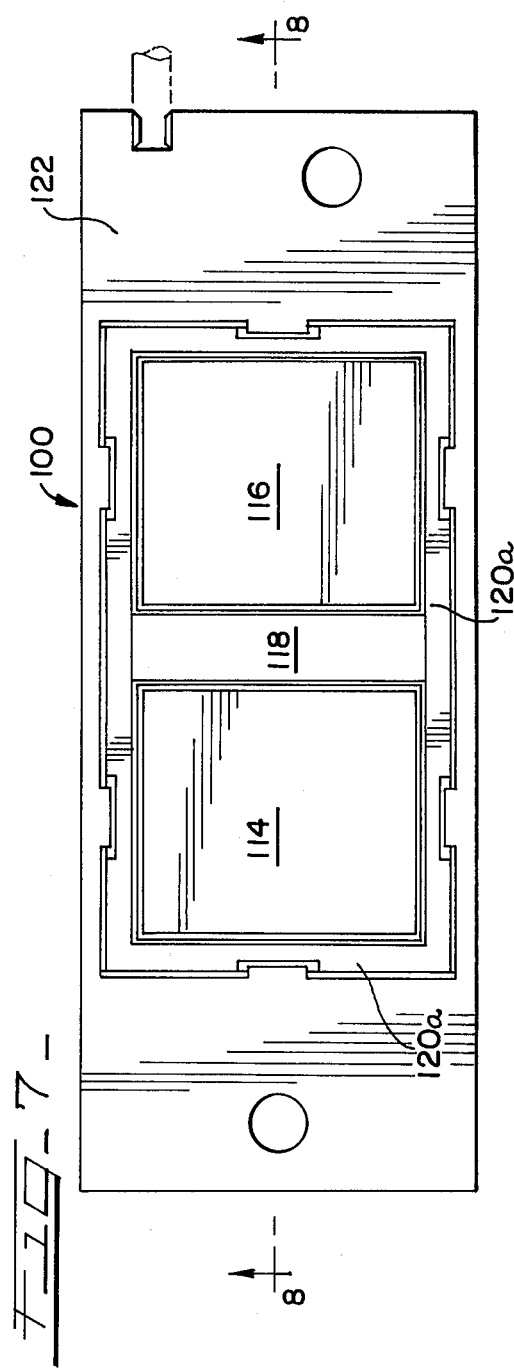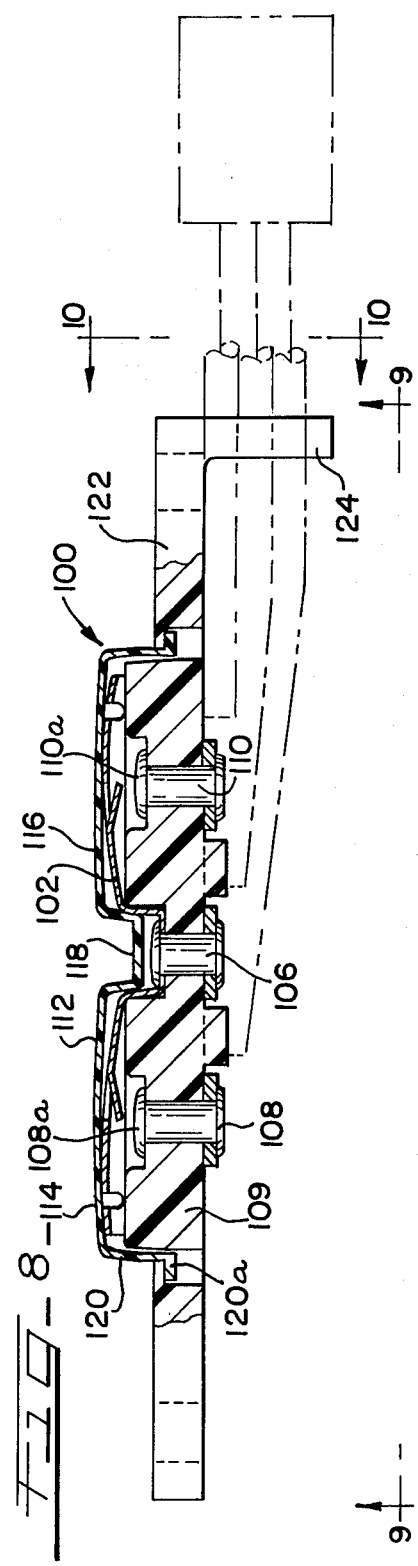

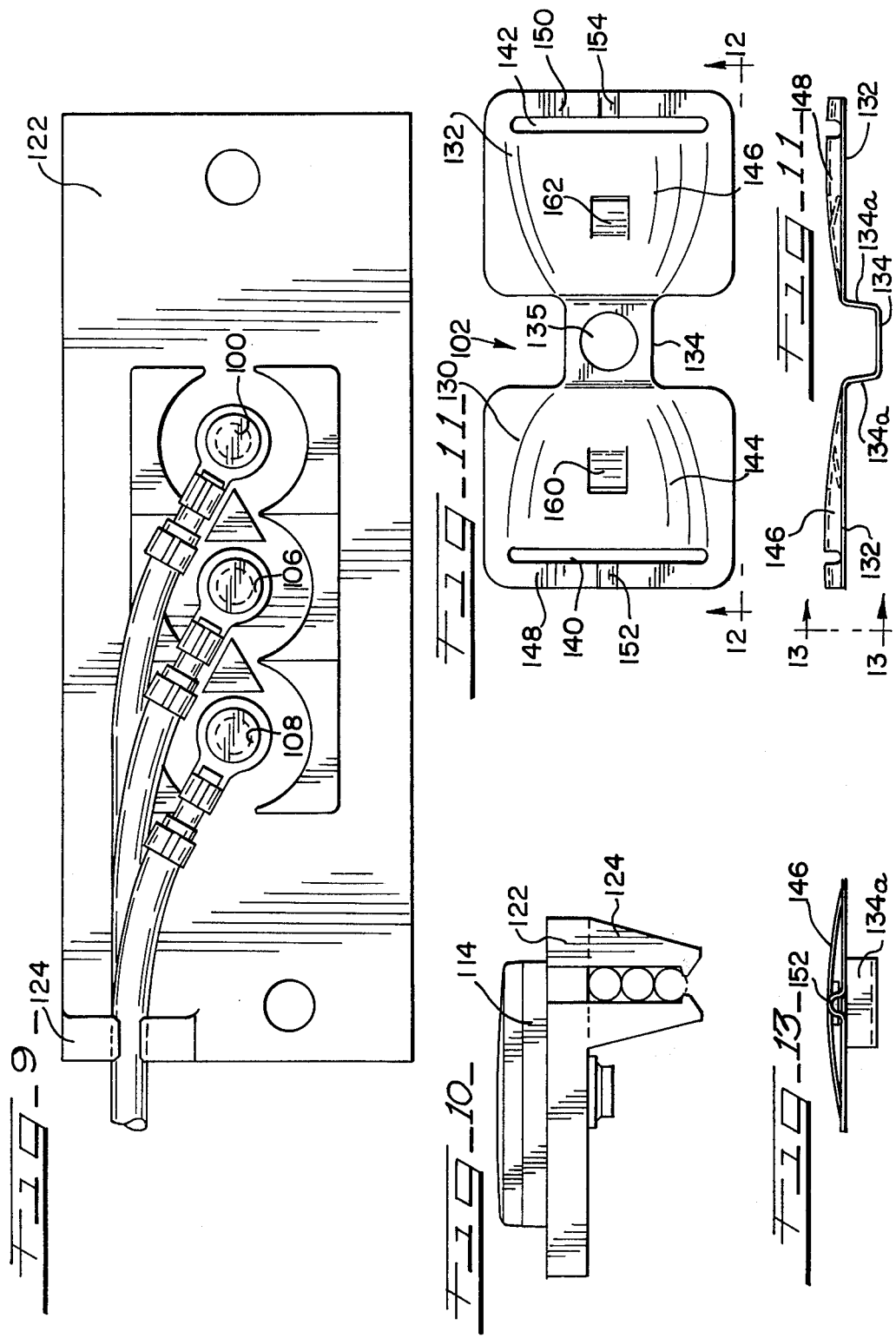

SWITCH ASSEMBLIES

BACKGROUND OF THE INVENTION

This invention relates to electrical devices and, in particular, to an improved switch assembly.

More specifically, but without restriction to the particular use which is shown and described, this invention relates to improved switch assemblies obtaining positive electrical contact through a device which provides enhanced tactile and audio feedback to the user.

In the prior art thousands of switch designs have been developed to operate electrical circuits and satisfy certain design objectives which are dictated by the particular use to which the switch is directed. Automobiles and other vehicles employ numerous switch assemblies to control the operation of various components which have been incorporated into the vehicle. For example, switch assemblies are provided to enable the driver of an automobile to control its automatic speed control systems. Switches are further used to permit locking and unlocking of the doors without manual operation of the locks themselves. The designers of these vehicles have recognized that certain physical attributes of a switch assembly are valuable for the convenience and safety of the operator or user. It is imperative that the switch assembly be capable of providing sustained service during which it is activated and deactivated thousands of times without failure. In accomplishing this objective, it is also advantageous that the user receive a positive tactile and audible feedback. This enables the user of the switch assembly to more adequately know that his command to perform the intended function has been accomplished.

Many switch designs have been employed to permit a vehicle operator to activate or deactivate operation of the automobile cruise control, the automobile door locks and other features. In general these switches have suffered from several deficiencies which have rendered them less than satisfactory. For example, prior switch assemblies of this type have relied upon relatively complicated and expensive designs in beneficially attaining positive electrical contact with suitable tactile and audible feedback. Such switch assemblies have also failed to provide an effective scrubbing action between the electrical contacts to insure extended and effective operation. Moreover, the relative complexity of the prior assemblies has resulted in an unnecessary expensive component to produce both tactility with overall effectiveness of switch operation. Accordingly, prior switches of this type have failed to attain trouble free service through the employment of a design capable of providing tactile and audible feedback as is desirable in numerous applications.

SUMMARY OF THE INVENTION

It is therefore, an object of this invention to provide a more effective design for a switch assembly.

Another object of this invention is to provide a switch assembly having superior tactile and audible feedback.

A further object of this invention is to reduce the complexity of a switch assembly providing tactile and audible feedback.

Still another object of this invention is to provide a switch contact which is capable of generating tactility.

A still further object of this invention is to provide a switch assembly capable of sustained trouble free service in use.

Still another object of this invention is to provide a switch assembly in which contacting elements undergo a scrubbing action to maintain optimum electrical contact.

These and other objects are attained in accordance with the present invention wherein there is provided improved switch assemblies which are capable of achieving effective electrical contact along with the desirable objectives of obtaining tactile, where a feel to the touch is detected, and audible feedback. The switch assembly of the invention achieves such beneficial results through the use of a simplified design in which the necessity for unnecessary switch parts to produce such sensory objectives are eliminated. In one embodiment of the invention, the switch assembly further provides a scrubbing action between the contacting elements of the switch, such that the device will maintain the capability of providing positive electrical contact of the elements, even after long sustained use. Moreover, since the scrubbing action of the switching assembly herein disclosed provides enhanced electrical contact over a long period of time, the cost of the switch assembly may be reduced by using less conductive materials as switch elements, such as steel and the like, which material also provides greater strength and durability. Since the number of components of the switch assembly of the invention is reduced and the design simplified, its overall cost of manufacture is significantly reduced as compared to previous designs producing tactile and audible feedback in a switch mechanism.

DESCRIPTION OF THE DRAWINGS

Further objects of the invention together with additional features contributing thereto and advantages accruing therefrom will be apparent from the following description of preferred embodiments of the invention which are shown in the accompanying drawings with like reference numerals indicating corresponding parts throughout, wherein:

FIG. 1 is a front partial perspective view of a first embodiment of the switch assembly of the invention operatively mounted on the steering wheel of a vehicle;

FIG. 2 is a sectional view of the switch assembly of the invention taken along lines 2—2;

FIG. 3 is a bottom schematic view, with parts removed, of the switch assembly of FIG. 2;

FIG. 4 is a top view, with parts removed, of the switch assembly of FIG. 3;

FIG. 5 is a partial sectional view taken along lines 5—5 of FIG. 4 showing the flexible contact and tactile contactor of the switch assembly of the invention;

FIG. 6 is a side schematic view of the housing of the switch assembly of FIG. 2;

FIG. 7 is a top schematic view of another embodiment of the switch assembly of the invention for use as a door lock and unlock mechanism for a vehicle;

FIG. 8 is a sectional view taken along lines 8—8 of FIG. 7;

FIG. 9 is a bottom schematic view taken along lines 9—9 of FIG. 7;

FIG. 10 is an end schematic view of the switch assembly of FIG. 7;

FIG. 11 is a top schematic view of the tactile contactor used in the switch assembly of FIG. 7;

FIG. 12 is a side schematic view of the tactile contactor of FIG. 11 taken along lines 12—12 of FIG. 11 and;

FIG. 13 is an end schematic view of the tactile contactor of FIG. 11 taken along lines 13—13 of FIG. 12.

DESCRIPTION OF THE PREFERRED EMBODIMENTS

Referring now to FIGS. 1 through 6, there is illustrated switch assemblies 2 and 2a of the invention mounted in operative position on the steering wheel of an automobile, for the purpose of allowing the driver to control the mode of operation of the speed or cruise control system typically installed in many vehicles. Although switch assemblies 2 and 2a are described with reference to a vehicle speed control system, it is within the scope of this invention to use these components in countless other applications.

Referring now to FIGS. 2, 3 and 6, switch assembly 2 is best illustrated. Switch assembly 2 is provided with an outer housing and base 10 formed from a suitable material, such as a plastic, metal and the like, and having a rectangular configuration, although other shapes may be employed. A pair of elongated shafts 11 having threaded open ends extend through openings 12 in the housing 10 to mount the switch assembly on the steering wheel. The walls of the housing 2 are provided with a series of two larger openings 14 and two smaller central openings 16, with identical openings being provided in both side walls. A lower opening 12' is also provided in the base 10 through which the electrical leads, connecting the switch assembly to the circuit of the cruise control system of the vehicle, may extend as shown.

A mounting member 20 fabricated from an electrical insulating plastic material and the like is mounted within the housing 10. The mounting member 20 is supported in place through the use of a series of projections 22 which project outward to form shoulders and extend into the openings 14 and 16 provided in the housing side walls. A flat conductive strip 24 of copper having a predetermined configuration to provide a suitable electrical connection is molded in the plastic mounting member 20. The mounting member 20 has a series of predetermined openings in its upper and lower surface such that the copper strip 24 is at least partially exposed. A series of flexible electrical contacts 26 are cut out from a C-shaped opening in strip 24 and extend upward. The flexible contacts 26 may be formed on the strip 24 after the copper element is molded into the plastic mounting member 20.

An upper strip 30 of conductive material in the form of a steel or other conductive metal is affixed by rivots 30a to the top of plastic mounting member 20. As best shown in FIG. 4, the strip 30 is formed with three parallel pairs of longitudinally extending slits 34 and 36 to create a series of border sections 37. By shortening the length of the border sections 37 after the slits have been made on the strip as evidenced by curved section 37', raised or warped positions 38 are created to form both an electrical contact and a tactile contactor. As is seen in FIG. 2, the raised areas 38 of the strip are positioned above each of the three flexible fingers 26 extending from the conductive strip 24.

The mounting plate 20 further supports certain electrical components, such as resistors 39 (FIG. 3), which are suitably interconnected with the electrical circuit of the cruise control system of the vehicle in a conventional manner. The resistors may be supported in cavities arranged on underside of the plastic mounting member 20.

As will be explained more fully, the switch assembly 2 of the invention is caused to be closed by contact of a respective one of the three tactile contactors 38 with its associated flexible finger 26 dependent on the control mode desired. Such electrical contact between the tactile member 38 and the flexible finger 26 is provided by a pair of separately mounted actuators or buttons 40 and 42. Actuator 40 is formed with an open bottom and hollow construction having a top surface 44, a pair of end walls 46 and a pair of side walls (not shown). Similarly, but with a smaller axial dimension, the actuator 42 is formed with a hollow rectangular configuration formed by upper surface 48, end walls 50 and a pair of spaced side walls (not shown). Although the actuators 40 and 42 can be formed from other materials, these components may be suitably fabricated from a metal.

The pivotal movement of actuator 40 is attained by a pair of pins 52 integrally formed on each side of the actuator at the bottom of a vertical interior wall 54. The wall 54 is disposed substantially at the midpoint of the actuator body, and the pins 52 extend into one of three openings 58 formed in the side walls of the body 10. Thus, the pivotal mounting of actuator 40 permits the member to be rocked in either direction as desired. Similarly, actuator 42 is mounted by a pair of pins 59, integrally affixed by an integral projection 59 to a side wall 50 of the actuator 42, which pins are inserted into another pair of corresponding holes in the housing 10. The actuator 42 is only capable of rocking movement in a counter-clockwise direction viewing FIG. 2. A lip 50a of actuator 42 is adapted to contact an interfering shoulder formed on housing 10, when undergoing rocking movement, to act as a stop and prevent further depression of the actuator 42.

As can be seen in FIG. 2, a pair of tubular like members 60 and 62 project integrally downward from the upper wall of the actuator 40 at a position equal distance from pivot 52 on opposite sides thereof. The tubular members 60 and 62 have a lower end positioned in alignment with and slightly above the top of the two of raised areas 38. A silicone boot 66 is attached to the end of both tubular members 60 and 62 and lies in normal position in contact or near contact with the respective raised areas 38. The boot 66 provides the user with a softer, more pleasant feel when rocking the actuator 40 in either direction.

When the actuator 40 is rocked either clockwise or counter-clockwise depending on the mode of operation desired, the member 60 or 62 causes the raised areas 38 forming a tactile contactor to deform and to go through center for attaining electrical contact between tactile contactor 38 and flexible contact 26 and closing the switch. The raised areas 38 will rebound to their original shape upon release of the actuator 40. The tactile areas 38 provide a detectable feel to the user that permits the operator to know that a certain function has been accomplished. Thus, the tactile member 38 serves to function not only as a switch contact, but also as a tactile contactor.

The flexible fingers 26 and tactile members 38 are so positioned relative to each other that the rocking motion of actuator in either direction creates electrical contact prior to the tactile member 38 actually going through center to insure that a suitable connection has been made before the operator feels the resiliency of the tactile member 38. This improved design of the contacts also accomplishes another function which is important for operation of the switch over long sustained use. The flexible finger 26 undergoes lateral rubbing with the tactile contactor 38, once the finger 26 contacts the underside of the contactor 38, such that further depression thereof causes deflection of the flexible finger in a manner that it rubs along the contactor 38 to achieve a self-cleaning scrubbing action to remove arc residue and provide a cleaner contact for maintenance of more effective electrical conductivity.

Another associated advantage arising by such scrubbing between the contacting elements 26 and 38 is that expensive conductive material, such as copper, does not necessarily have to be used as the tactile member. Less conductive metals, such as stainless steel and the like, which are stronger and provide considerable advantages because of such strength, may be employed to resist forces that copper cannot sustain. Thus, it is possible to use stainless steel even though it does not have the best conductive properties, because the cleaning action of the contact will maintain optimum electrical performance as opposed to the rigid contact of prior art switches.

The actuator 42 is likewise has an integral downward extending member 68 having a silicone boot 69 mounted at the lower end to effect contact between the flexible contact element 26 and the tactile member 38 to accomplish the same result as described with reference to actuator 40.

In a speed control system for a vehicle, the actuators 40 and 42 can control several modes of operation of the system. In viewing FIGS. 1 and 2, the actuator button 40 may be rocked counter-clockwise by manual contact with a portion of the switch adjacent the words "coast" to achieve that mode, or clockwise by contacting the area of the button 40 "set accelerator", or button 42 actuated in a counter-clockwise direction to resume speed control.

The switch assembly 2a, which is constructed in a similar manner as assembly 2, is adapted to rock about the center portion of the housing at hole 70 (FIG. 6) and has a construction similar to actuator 40 by having two tubular fingers and respective pairs of flexible fingers and tactile contactors identical to elements 26, 38. Thus, by rocking actuator 72 of the switch assembly 2a in a first direction will cut off the speed control system or in the opposite direction will actuate the system through respective contact between the respective tactile member and the flexible finger. In switch assembly 2a, the end walls of the actuator may have suitable lower surfaces to contact the housing 10 to act as stop surfaces in either direction of swinging. The switch assembly 2a also accordingly provides the tactile feel and superior switch contacting action of assembly 2.

Referring now to FIGS. 7 through 13, there is illustrated another embodiment of the switch assembly of the invention which is used as a lock/unlock control switch for a vehicle door. The embodiment of FIGS. 7 through 13 is capable of enhanced switch operation and provides effective audio and tactile feedback as does the previously described embodiment. The switch assembly 100 is adapted to be interconnected in the electrical circuitry of a typical electrically operated door lock system and permits the operator to selectively lock or unlock the door depending on which switch button or actuator is pressed.

In the embodiment of FIGS. 7 through 13, the tactile member producing the desired feel of the switch and associated sound is combined with a flexible contact finger into a single component 102 in a manner to be described. The conductive tactile member 102 is mounted on a plastic base member 104 by means of a center rivot 106 disposed in a hole formed in the plastic support member 104. As seen in FIG. 1, the switch has a rectangular configuration although it can encompass other shapes as desired. The plastic base member 104 further is provided with a pair of fixed rivot contact base members 108 and 110 having an enlarged upper end 108a and 110a disposed beneath the tactile member 102.

The fixed rivots 108 and 110 extend through the plastic base member 104 and terminate beneath member 104 as does the central fixed rivot 106. A plastic cover 112 is mounted above both the tactile member 102 and the base member 104 and is formed with raised portions 114 and 116 of a flexible deformable material. Manual deformation of a selected raised area in turn causes movement of a portion of the tactile member 102. The two raised areas 114 and 116 are separated by a channel-like, rigid partition laterally extending between the two areas. Rigid walls 120 having a lower shoulder 120a surround the four sides of the cover and are adapted to be interconnected with a base member 122 which mounts the switch assembly in place. The base member 122 may be formed with a typical bracket 124 that guides and secures three electrical connecting wires 126 which extend from the rivot contact base members, in connection therewith, to the electrical circuit of the door locking system of the vehicle. Depression of the raised area 114 of the plastic cover locks the vehicle door, while depression of raised area 116 can be used to unlock the vehicle door or vice versa depending on desired considerations.

Referring now to FIGS. 8, 11, 12 and 13 the construction of the tactile member 102 is best illustrated. Tactile member 102 may be formed from a suitable conductive material, such as copper or other material, and acts to create electrical contact with the heads 108a or 110a of the respective rivot contacts in response to depression of the raised areas 114 or 116 of the cover. Since the force involved in operation of the switch 100 may, under most circumstances, be smaller than the force encountered in the preceding embodiment, the tactile member 102 can conveniently be constructed from copper, possessing higher conductive properties. The tactile member 102 is divided into two sections 130 and 132 which are interconnected by a narrowed section 134. Narrowed section 134 is positioned beneath the general plane of end portions 130 and 132 and is integrally connected thereto by walls 134a and 134b. The narrowed section 134 is adapted to be mounted in a cavity formed in member 104, and rivot 106 is inserted through a hole 135 in section 134 to secure the tactile member in place.

As best shown in FIGS. 11 and 12, end portions 130 and 132 include a pair of laterally extending slits 140 and 142 positioned near the edges thereof, which are used to create warped areas 144 and 146, generally designated by the lines shown in FIG. 10. The slits 140 and 142 form border portions 148 and 150 which are separated from the main part of sections 130 and 132 to create the warped areas. The presence of the slits 140 and 142 allows the border areas 148 and 150 to be shortened as indicated by the presence of the raised areas 152 and 154 thereon for causing the warping of areas 144 and 146. The warped constructions create a resilience in the structure and provides a pair of tactile areas 144 and 146, such that when the raised areas 114 and 116 of the cover alternatively are depressed, portions 146 and 148 will be depressed or deformed to the tactile detection by the user. During such movement the corners of the tactile member 102 contact the cover structure 116 to produce a noise and hence enhanced audio feedback is achieved as well as tactile feedback.

Suitable electrical contact is attained through the use of flexible fingers 160 and 162 which are lanced downward out of the sections 130 and 132 and form flexible contacts of the switch assembly 100. The contacts 160 and 162 are then caused to move down into contact with the fixed rivot contact heads 108a or 110a, depending on whether a locking or unlocking mode is desired. From the foregoing it should be apparent that the embodiment of FIGS. 7 through 13 provides a much larger tactile area than the preceding embodiment, such that greater sensitivity for purposes of operation is obtained. This feature allows a major portion of the plate area of actuator surfaces 114 and 116 to be depressed and effect proper contact.

While the invention has been described with reference to a preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A switch assembly comprising:
   base means supporting first and second electrical contacts in a normal open, spaced relationship;
   said first electrical contact being a conductive member having a raised deformable tactile area formed thereon and providing a tactile feel before said tactile area is deflected through center;
   said second electrical contact being an electrically conductive member mounted on said base means and including a flexible finger mounted adjacent said tactile area;
   actuator means operatively positioned adjacent said tactile area for causing said tactile area to deform and physically move into contact with said flexible finger to close said first and second contact, said flexible finger being deflected in response to physical contact by said deformable tactile area;
   said actuator means having at least one manually operated member movable between a first position and second position, said at least one member acting to deform said tactile area during movement from said first position to said second position, and said tactile area providing a detectable resilience during said movement after said tactile area contacts said flexible finger;
   a portion of said second electrical contact is molded within said base means, said base means having an opening adjacent said tactile area;
   said flexible finger being integrally connected to said portion of second electrical contact within said opening, said flexible finger having an upwardly directed free end disposed above said base means and being arranged to contact said tactile area after deformation thereof, said finger making electrical contact with said tactile area prior to said tactile area going through center while being deflected.

2. The switch assembly according to claim 1 wherein said member is mounted for rocking movement.

3. The switch according to claim 1 wherein said first electrical contact and said second electrical contact respectively include a plurality of tactile areas and flexible fingers respectively in alignment with each other;
   said actuator means being arranged to be moved to deform a selected one of said tactile areas for contacting a respective flexible finger, said actuator means having a pair of actuators mounted for rocking movement.

4. The switch assembly according to claim 1 wherein said tactile area provides tactile and audio feedback during deformation.

5. The switch assembly according to claim 1 wherein said flexible finger moves relative to said tactile area during deflection for causing said tactile area and said flexible finger to undergo scrubbing action during contact.

6. A switch assembly comprising:
   body means supporting first and second electrical contacts in normally open relationship,
   said first electrical contact having a raised tactile area capable of being deformed for movement in response to the application of a force thereto,
   an actuator member mounted adjacent said tactile area to apply a force thereto and cause said first electrical contact to contact said second contact for creating an electrical connection,
   said tactile area being formed by a warped section of said first electrical contact,
   said first electrical contact having a slit provided on one side of said warped section to separate said warped section from a border section adjacent an edge of said first electrical contact, said first electrical contact having at least one connecting section joining said border section at one end of said slit, and
   the length of said border section is physically shortened relative to said warped section to create said raised tactile area.

7. The switch assembly according to claim 6 wherein tactile and audio feedback is attained during said deformation of said tactile area.

8. The switch assembly according to claim 6 wherein said first electrical contact is formed with a flexible finger in said tactile area,
   said flexible finger contacting said second electrical contact during said deformation of said tactile area.

9. A combined electrical contact and tactile connector for a switch assembly comprising:
   a conductive body having at least one slit disposed adjacent one edge of said body,
   said slit dividing a border portion and a warped section providing a deformable tactile area, and
   said warped area being formed by the physical shortening of said border portion.

10. The contact and tactile contactor according to claim 9 wherein said body includes a pair of slits adjacent opposite edges of said body to form a pair of border portions, each of said border portions being physically shortened.

11. The contact and tactile contactor according to claim 10 wherein said warped area is positioned between said pair of slits.

12. The contact and tactile contactor according to claim 11 wherein said body includes a plurality of pairs of slits to create a plurality of border portions and warped areas respectively therebetween, each of said plurality of border portions being physically shortened.

13. The combined contact and tactile contactor according to claim 10 wherein a pair of separated warped areas are positioned between said pair of slits.

14. The combined contact and tactile contactor according to claim 13 wherein a flexible finger extends outward from each of said warped sections.

15. The combined contact and tactile contactor according to claim 14 wherein said pair of warped sections are separated by a narrowed-down section of said conductive body.

16. A switch assembly comprising:
   base means supporting first and second electrical contacts in a normally open, spaced relationship;
   said first electrical contact being a conductive member having a raised deformable tactile area formed thereon and providing a tactile bell before said tactile area is deflected through center;
   said second electrical contact being an electrically conductive member mounted on said base means and including a flexible finger mounted adjacent said tactile area;
   actuator means operatively positioned adjacent said tactile area for causing said tactile area to deform and physically move into contact with said flexible finger to close said first and second contact, said flexible finger being deflected in response to physical contact by said deformable tactile area;
   said actuator means having at least one manually operated member movable between a first position and second position, said at least one member acting to deform said tactile area during movement from said first position to said second position, and said tactile area providing a detectable resilience during said movement after said tactile area contacts said flexible finger;
   a portion of said second electrical contact is molded within said base means, said base means having an opening adjacent said tactile area;
   said flexible finger being integrally connected to said portion of second electrical contact within said opening, said flexible finger having an upwardly directed free end disposed above said base means and being arranged to contact said tactile area after deformation thereof;
   said tactile area is formed by a warped section of said first electrical contact, said warped section being integrally joined at opposite ends to said first electrical contact, a pair of spaced slits being formed in said first electrical contact bordering a portion of said warped section to create a pair of border portions in said first electrical contact adjacent said warped section, said border portions being physically shortened relative to said slits for causing said warped section to create said raised tactile area.

* * * * *